United States Patent
Song (10) Patent No.: US 10,627,892 B2
(45) Date of Patent: Apr. 21, 2020

(54) IMAGE FORMING APPARATUS WITH CIRCUIT UNIT TO CUT OFF POWER TO ITSELF AND ITS CPU IN A STANDBY MODE

(71) Applicant: Hewlett-Packard Development Company, L.P., Spring, TX (US)

(72) Inventor: Seog-ho Song, Yongin-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 426 days.

(21) Appl. No.: 13/687,371

(22) Filed: Nov. 28, 2012

(65) Prior Publication Data

US 2014/0149776 A1  May 29, 2014
US 2014/0258758 A9  Sep. 11, 2014

Related U.S. Application Data

(63) Continuation of application No. 12/579,552, filed on Oct. 15, 2009, now Pat. No. 8,347,136.

(30) Foreign Application Priority Data

Oct. 23, 2008  (KR) .................. 10-2008-00104326

(51) Int. Cl.
*G06F 1/32* (2019.01)
*G06F 1/3293* (2019.01)
*G06F 1/3203* (2019.01)

(52) U.S. Cl.
CPC .......... *G06F 1/3293* (2013.01); *G06F 1/3203* (2013.01); *Y02D 10/122* (2018.01); *Y02D 10/159* (2018.01)

(58) Field of Classification Search
CPC ...... G06F 1/266; G06F 1/3203; G06F 1/3287; G06F 1/26; G06F 1/3206; G06F 1/3231;
(Continued)

(56) References Cited

U.S. PATENT DOCUMENTS 5,949,853 A * 9/1999 Resnick .............. H04M 1/6505
                                              379/102.02
6,802,010 B1 * 10/2004 Kim ...................... G06F 1/3203
                                              713/310
(Continued)

FOREIGN PATENT DOCUMENTS

JP          2007-98920     4/2007
KR     10-2008-0064365     7/2008

OTHER PUBLICATIONS

U.S. Notice of Allowance dated Aug. 29, 2012 issued in U.S. Appl. No. 12/579,552.
(Continued)

*Primary Examiner* — Danny Chan
(74) *Attorney, Agent, or Firm* — Staas & Halsey LLP (57) ABSTRACT

An image forming apparatus and a control method thereof includes an image forming unit to form images, a main control unit to control operations of the image forming unit; a switching unit to selectively supply an operating voltage to the main control unit according to a level of the voltage control, a power mode selecting unit to convert an on state or an off state according to a user's operation, a first voltage determining unit to determine a level of the control voltage according to the state of the power mode selecting unit, and a second voltage determining unit to determine the level of the control voltage in parallel with the first voltage determining unit, according to the control signal output from the main control unit.

8 Claims, 5 Drawing Sheets

(58) Field of Classification Search
CPC .... G06F 1/3234; G06F 1/3243; G06F 1/3265; G06F 1/3284; H02J 9/005; H04N 2201/0094
USPC .......................................................... 713/324
See application file for complete search history.

(56) References Cited

U.S. PATENT DOCUMENTS

| | | | |
|---|---|---|---|
| 7,624,288 B2 | 11/2009 | Kishi et al. | |
| 7,923,864 B2 | 4/2011 | Azuma et al. | |
| 8,836,173 B2 * | 9/2014 | Koch | 307/115 |
| 2001/0043050 A1 * | 11/2001 | Fisher, Jr. | 320/101 |
| 2005/0007628 A1 * | 1/2005 | Yamano | G06F 1/3203 358/1.15 |
| 2005/0063725 A1 * | 3/2005 | Matsukura | 399/88 |
| 2005/0200313 A1 * | 9/2005 | Teradaira | B41J 2/175 315/291 |
| 2006/0010331 A1 * | 1/2006 | Ohara | 713/323 |
| 2006/0028903 A1 * | 2/2006 | Hada | 365/232 |
| 2007/0146775 A1 | 6/2007 | Maeda | |
| 2007/0171449 A1 * | 7/2007 | Tanno | G06F 3/1204 358/1.13 |
| 2007/0214372 A1 * | 9/2007 | Doyon | H04M 19/08 713/300 |
| 2007/0236721 A1 * | 10/2007 | Okamoto | G06F 1/3209 358/1.14 |
| 2007/0260358 A1 * | 11/2007 | Katoh | 700/286 |
| 2007/0262655 A1 * | 11/2007 | Lin | G09G 3/3406 307/140 |
| 2008/0222433 A1 * | 9/2008 | Kim | G06F 1/3203 713/300 |
| 2009/0010671 A1 * | 1/2009 | Hashimoto | 399/88 |
| 2009/0074430 A1 | 3/2009 | Nakazato et al. | |
| 2009/0164819 A1 * | 6/2009 | Berger | G06F 1/3203 713/323 |
| 2009/0287945 A1 * | 11/2009 | Kim et al. | 713/323 |
| 2010/0011234 A1 * | 1/2010 | Malik | G06F 1/3203 713/323 |
| 2011/0078468 A1 * | 3/2011 | Ohno | 713/310 |
| 2012/0170321 A1 * | 7/2012 | Yang et al. | 363/16 |

OTHER PUBLICATIONS

U.S. Non-Final Office Action dated Mar. 26, 2012 issued in U.S. Appl. No. 12/579,552.
Korean Office Action dated Nov. 18, 2015 in corresponding Korean Patent Application No. 10-2009-0098297, 10 pages.

* cited by examiner

| Step | PW_SW | T1a,T1b | Vs | PW_SW state report | control signal | C | V2 | T2 | V1 | FET | VCC | power mode | main CPU |
|---|---|---|---|---|---|---|---|---|---|---|---|---|---|
| 1 | Off | Off | - | - | - | discharged | Low | Off | High | Off | Low | standby mode | Off |
| 2 | On | On | Low | - | - | start to be charged | Low | Off | Low | On | High | mode change | start to boot (turn on) |
| 3 | Off | Off | High | - | - | charged | High | On | Low | On | High | | booting |
| 4 | Off | Off | High | - | High | charged | High | On | Low | On | High | normal mode | complete booting (nomally operate) |
| 5 | On | On | Low | report change of PW_SW state | High | charged | High | On | Low | On | High | mode change | prepare to enter standby mode |
| 6 | Off | Off | High | - | High | charged | High | On | Low | On | High | | |
| 7 | Off | Off | - | - | Low | discharged | Low | Off | High | Off | Low | standby mode | enter standby mode (turn off) |

IMAGE FORMING APPARATUS WITH CIRCUIT UNIT TO CUT OFF POWER TO ITSELF AND ITS CPU IN A STANDBY MODE

CROSS-REFERENCE TO RELATED APPLICATIONS

This application is a Continuation application of prior application Ser. No. 12/579,552, filed on Oct. 15, 2009 in the United States Patent and Trademark Office, which claims priority under 35 U.S.C. 119 (a) from Korean Patent Application No. 10-2008-00104326, filed on Oct. 23, 2008, in the Korean Intellectual Property Office, the disclosure of which is incorporated in its entirety.

BACKGROUND

1. Field of the Invention

Apparatuses and methods consistent with the present general inventive concept relate to an image forming apparatus and a control method thereof, and more particularly, to an image forming apparatus which changes a power mode in order to save electric power.

2. Description of the Related Art

In conventional image forming apparatuses including a printer, a multi-function device, such a configuration to perform an image forming operation consumes a large amount of power. Thus, the image forming apparatus has a standby mode not to supply power to main components such as a main central processing unit (CPU) while no image is being formed.

The image forming apparatus can be restored to a normal mode from a standby mode by waking up the main CPU in the standby mode. For restoration, the image forming apparatus can use a standby mode control means configured with a processor, a memory and so on. However, power consumption even to operate the standby mode control means is unavoidable.

Especially, it is necessary to minimize the consumed power by the standby mode control means, to thereby assure considerably low consumption of power in the standby mode, like a 1 W standby mode having drawn a recent attention.

In addition, there may be such an event as manipulation by a user in conversion between the standby mode and the normal mode. A power mode conversion in which the event and the control by the CPU are properly considered is requested.

SUMMARY

Accordingly, the present general inventive concept provides an image forming apparatus which power consumption in a standby mode can be minimized and simultaneously a power mode conversion event can be properly considered, in controlling the power mode conversion control.

The foregoing and/or other utilities of the present invention can be accomplished by providing an image forming apparatus, including an image forming unit to form one or more images, a main control unit to control operations of the image forming unit, a switching unit to selectively supply an operating voltage to the main control unit according to a level of a control voltage, a power mode selecting unit to change into an on state or an off state according to a user's operation, a first voltage determining unit to determine the level of the control voltage according to the state of the power mode selecting unit, and a second voltage determining unit to determine the level of the control voltage according to a control signal output from the main control unit.

The first voltage determining unit may include at least one first switching element that turns on or off, whereby the level of the control voltage is changed according to the state of the power mode selecting unit.

The power mode selecting unit may be provided in between the control voltage and the at least one first switching element.

The second voltage determining unit may include a second switching element that turns on or off, whereby the level of the control voltage is changed according to the control signal output from the main control unit.

The image forming apparatus may further include a voltage maintaining unit maintaining the level of the control voltage.

The voltage maintaining unit may maintain the level of the control voltage for a predetermined time after the level of the control signal output from the main control unit is changed.

The main control unit may change the level of the control signal based on the state of the power mode selecting unit.

The main control unit may change the level of the control signal based on a time during which the power mode selecting unit maintains its state.

The image forming apparatus may further include a state reporting unit that detects the state of the power mode selecting unit and reports the detected state of the power switch to the main control unit.

The foregoing and/or other utilities of the present invention can be accomplished by providing a control method of an image forming apparatus, including determining a level of a control voltage of a switching unit to selectively supply an operating voltage to a main control unit to control an image forming operation of the image forming apparatus, according to a state of a power mode selecting unit, the state of which is changed to an on or off state according to a user's operation, and determining the level of the control voltage according to a control signal output from the main control unit.

The determining of the level of the control voltage according to the state of the power mode selecting unit may include turning on or off at least one first switching element, whereby the level of the control voltage is changed according to the state of the power mode selecting unit.

The determining of the level of the control voltage according to the control signal output from the main control unit may include turning on or off a second switching element, whereby the level of the control voltage is changed according to a control signal output from the main control unit.

The control method may further include maintaining the level of the control voltage.

The maintaining of the level of the control voltage may further include maintaining the level of the control voltage for a predetermined time after the level of the control signal output from the main control unit is changed.

The control method may further include changing the level of the control signal based on the state of the power mode selecting unit.

The converting of the level of the control signal may include changing the level of the control signal based on a time during which the power mode selecting unit maintains its state.

The control method may further include detecting the state of the power mode selecting unit and reporting the detected state of the power mode selecting unit to the main control unit.

The foregoing and/or other utilities of the present invention can be accomplished by providing an image forming apparatus, including an image forming unit to form one or more images, a main control unit to control operations of the image forming unit, a power supply unit to supply power to the image forming unit and the main control unit, and a unit to control the power supply unit to selectively supply the power to the image forming unit and to selectively supply the power to the main control unit according to a selection of a standby mode and a normal mode.

The unit may control the power supply unit to interrupt the power supply to the main control unit according to a conversion between the selections of the standby mode and the normal mode.

The unit may include a mode selecting unit to select the standby mode and the normal mode, and a maintaining unit to provide a delay time for the selecting unit in a conversion between the standby mode and the normal mode.

The main control unit may include a memory unit and a main CPU, and the unit may control the power supply unit to selectively supply the power to the memory unit and the main CPU.

BRIEF DESCRIPTION OF THE DRAWINGS

The above embodiments and/or utilities of the present invention will become apparent and more readily appreciated from the following description of the exemplary embodiments, taken in conjunction with the accompanying drawings of which.

DETAILED DESCRIPTION OF THE EMBODIMENTS

Reference will now be made in detail to the exemplary embodiments according to the present general inventive concept, examples of which are illustrated in the accompanying drawings, wherein like reference numerals refer to the like elements throughout. The embodiments are described below in order to explain the present general inventive concept by referring to the figures.

Figure 1:
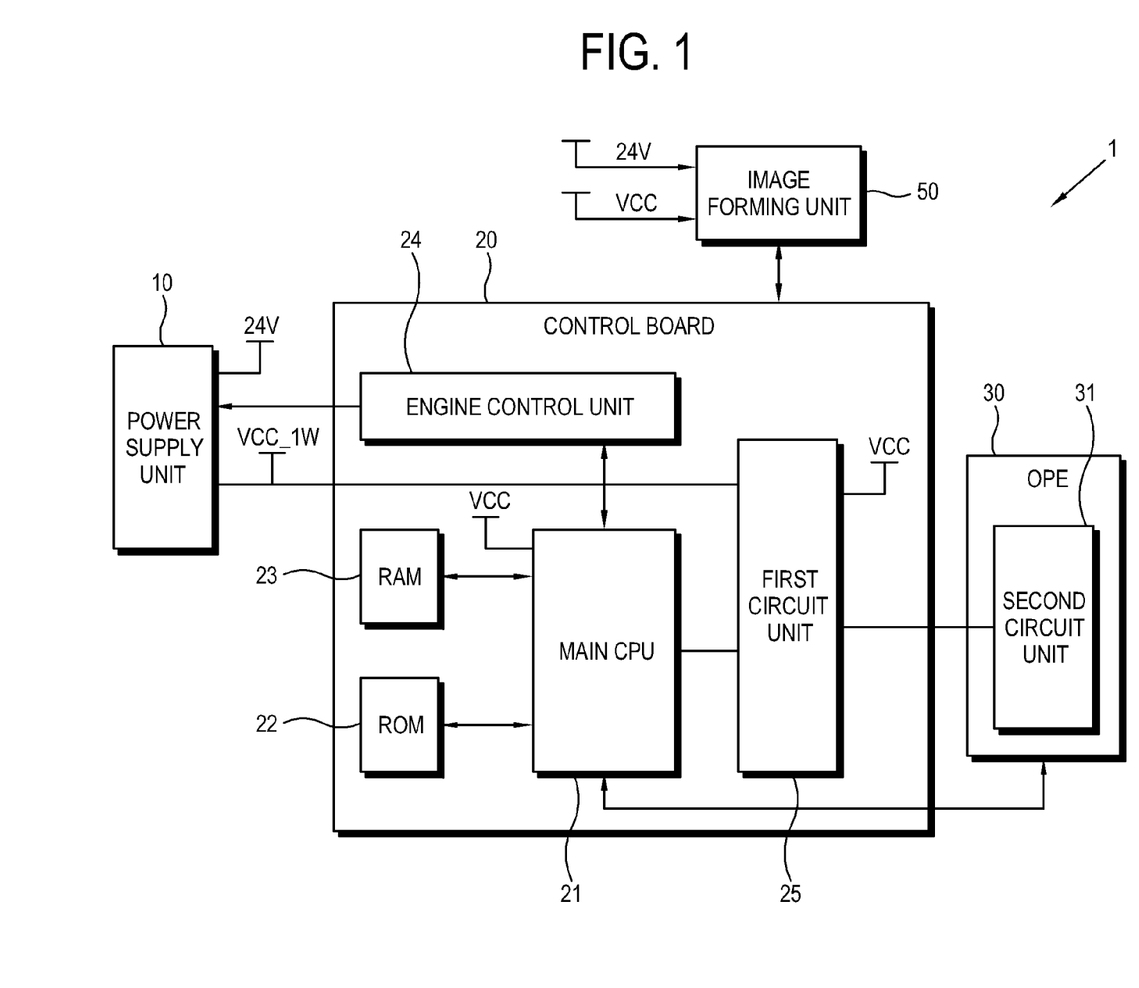
FIG. 1 is a block diagram illustrating a schematic configuration of an image forming apparatus according to an exemplary embodiment of the present invention.

FIG. 1 is a block diagram illustrating a schematic configuration of an image forming apparatus 1 according to an exemplary embodiment of the present general inventive concept. The image forming apparatus 1 may include a printer, a photocopier, a facsimile, a multi-function device and so on. The present embodiment of the general inventive concept is not limited by the afore-mentioned examples, and accordingly any image forming apparatuses may be utilized.

The image forming apparatus 1 receives image data to be printed from a host apparatus such as a personal computer (PC) (not illustrated), a sender's facsimile, storage elements including a universal serial bus (USB) memory, etc. or obtains image data to be printed by scanning any object to be duplicated using a scanner (not illustrated). Based on the image data received or obtained, the image forming apparatus 1 forms images on a printing medium such as a paper. The image forming apparatus 1 may include an image forming unit 50 that performs formation of images using the image data. The type of the image forming apparatus 1 may include laser printing and inkjet printing. Besides, the image forming apparatus 1 may further include a local connector to receive image data, a communication unit such as a network card, a connection unit for connection with a storage element, a scanning unit for scanning, etc., which are not illustrated in the accompanied drawings.

As illustrated in FIG. 1, the image forming apparatus 1 includes a power supply unit 10, a control board 20 and an operation panel ("OPE") 30. The power supply unit 10 supplies power to each component of the image forming apparatus 1, including an image forming unit 50 to perform an image forming operation. For example, in a laser printing type image forming apparatus, the power supplied by the power supply unit 10 includes a first power (24V) which is a high voltage for driving a fusing element of the image forming unit 50, and a second power (VCC_1W) of about 5V for operating other configurations of the image forming apparatus 1. The second power (VCC_1W) may be supplied in the form of an operation power (operation voltage, operating voltage, operating potential, or VCC) to a main CPU 21 and so on. For the sake of illustration, FIG. 1 illustrates that the operation power (VCC) is supplied only to the main CPU 21, but the present general inventive concept is not limited thereto. It is possible that the operation power (VCC) according to an exemplary embodiment of the present general inventive concept can be supplied to other configurations of the image forming apparatus 1.

The image forming unit 50 receives the first power (24V) and the second power (VCC_1W) selectively supplied from the power supply unit 10 and a control signal and/or image data outputted from the main CPU 21, to perform the image forming operation as described above.

The control board 20 refers to a circuit board such as a printed circuit board (PCB). The control board 20 may be provided with the main CPU 21 to control an operation of each configuration of the image forming apparatus 1, including the image forming unit 50, a read only memory (ROM) 22 to store a program executed by the main CPU 21, and a random access memory (RAM) 23 which is a main memory of the main CPU 21, may be provided in the control board 20. The main CPU 21 is an example of the main control unit of the present general inventive concept. In addition, an engine control unit 24 that controls the power supply unit 10 to supply power to the fusing element according to a command from the main CPU 21 may be provided on the control board 20. It is also possible that the engine control unit 24 may be provided in the main CPU 21.

The OPE 30 is a user interface and may include a key input unit (not illustrated) to receive an input according to a user's manipulation, a display unit (not illustrated) to display an operation state of the image forming apparatus 1, and an OPE control unit (see 32 of FIG. 2) that controls operations of the key input unit and the display unit.

For power-saving, the image forming apparatus 1 has two power modes: a normal mode in which power is supplied to normally perform an image forming operation, and a standby mode in which power supply to some configurations of the image forming apparatus 1 is interrupted in non-image formation operation. In the normal mode, the operation power VCC is supplied to the main CPU 21 and others of the image forming apparatus 1 whereas supply of the operation power VCC to the main CPU, etc., is interrupted in the standby mode. In the standby mode, it is possible that a voltage of 24V may not be supplied to the fusing unit of the image forming unit 50.

For conversion of the normal mode to the standby mode and vice versa (hereinafter, "power mode conversion"), the image forming apparatus 1 includes a first circuit unit 25 and a second circuit unit 31 to control supply of the operation power VCC to the main CPU 21 or others thereof. The first circuit unit 25 is provided in the control board 20 and the second circuit unit 31 is provided in the OPE 30. In the present exemplary embodiment, the first and the second circuit units 25 and 31 are provided respectively in different constructions, but they may be provided in one and the same construction, or otherwise, the first and the second circuit units 25 and 31 may be configured with a single circuitry.

The first circuit unit 25 and the second circuit unit 31 are respectively embodied with resistors or switching elements, having a very low consumption of power in an off state compared to a conventional circuit. Accordingly, the first circuit unit 25 and the second circuit unit 31 can minimize the power consumption in performing the power mode conversion control, as compared to a controller including a processor and a memory, which consumes a relatively large amount of power.

Figure 2:
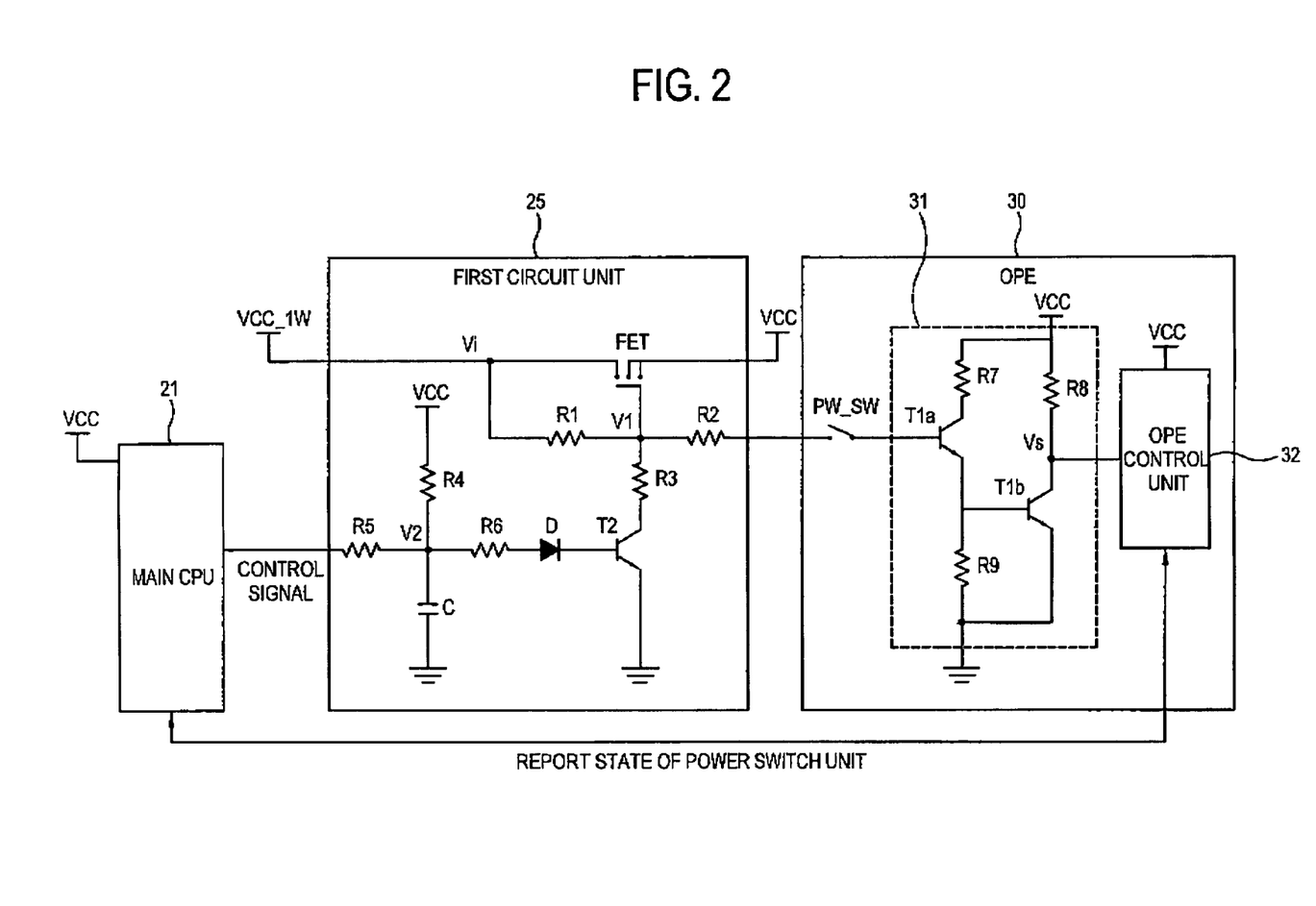
FIG. 2 illustrates a configuration of a first and a second circuit portions according to an exemplary embodiment of the present invention.

FIG. 2 illustrates configurations of a first circuit unit 25 and a second circuit unit 31 according to an exemplary embodiment of the present general inventive concept. As illustrated in FIG. 2, the first circuit unit 25 includes a switching unit (FET) selectively outputting the operation voltage (VCC) with respect to the second power (VCC_1W), input according to the level of a control voltage V1. The switching unit may be embodied with a field-effect transistor (FET). Here, an input voltage Vi is equal to the voltage of the second power VCC_1W, and a resistor R1 is interposed between the input voltage Vi and the control voltage V1.

The control voltage V1 is a gate voltage of the switching unit (FET). The switching unit (FET) is turned off where the control voltage V1 is at a high level, not outputting the operation voltage (VCC), but it is turned on where the control voltage V1 is at a low level, outputting the operation power (VCC).

The image forming apparatus 1 includes a power switch unit (PW_SW) having a on or off state according to operation by a user, in order to implement a power mode conversion control according to an operation by the user. In this embodiment, the power switching unit (PW_SW) may be achieved by a button-type switch which becomes on state while being pressed by a user but returns to off state while being not pressed by a user. The power switching unit (PW_SW) is an example of a power mode selecting unit of the present invention. A first end of the power switch unit (PW_SW) is connected to a control voltage (V1) through a resistor (R2). The power switch unit (PW_SW) according to one exemplary embodiment of the present general inventive concept may be provided in the OPE 30.

The second circuit unit 31 determines a level of the control voltage V1 to open or close of the switching unit (FET) according to a state of the power switch unit (PW_SW). According to one exemplary embodiment of the present general inventive concept, the second circuit unit 31 includes a pair of first switching element T1*a* and T1*b* which turn on or off, to allow the level of the control voltage (V1) to be changed according to the state of the power switch unit (PW_SW). The pair of first switching elements T1*a* and T1*b* may be implemented by a bipolar transistor and the like. A second end of the power switch unit (PW_SW) is connected to a base terminal of the first switching unit T1*a*. Emitter terminals of first switching elements T1*a* and T1*b* are connected to a ground directly or through a resistor (R9). Collector terminals of the first switching elements T1*a* and T1*b* are connected to the operating voltages (VCC) through resistors (R7 and R8), respectively.

The second end of the power switch unit (PW_SW) is grounded through the pair of first switching elements T1*a* and T1*b*, and the control voltage V1 exists on a path between the input voltage Vi and the power switch unit (PW_SW). Thus, such a path is opened in the state that the power switch unit (PW_SW) is opened, so that the control voltage V1 becomes high as the same level as the input voltage Vi, thereby turning off the switching unit (FET).

On the other hand, in the state that the power switch unit (PW_SW) is closed, the control voltage V1 is equal to a sum of voltage applied to the resistor R2 and voltage applied between the base and the emitter of the pair of first switching elements T1*a* and T1*b* if the voltage applied to the power switch unit (PW_SW) is ignored. In this embodiment, the resistance of the resistors R1 and R2 may be determined by taking account of the voltage between the base and the emitter of the pair of first switching elements T1*a* and T1*b*, so that the control voltage V1 can turn on the switching unit FET when the power switch unit (PW_SW) is closed.

In this embodiment, where the power switch unit (PW_SW) is closed, the pair of first switching elements T1*a* and T1*b* is turned on. For example, if a bipolar transistor is used as the pair of first switching elements T1*a* and T1*b*, the resistance of the resistors R1 and R2 can be determined to turn on the pair of first switching elements T1*a* and T1*b* when the power switch unit (PW_SW) is closed, in consideration that a forward voltage between the base and the emitter of each first switching element T1*a* and T1*b* approximately ranges from 0.3V to 0.8V and the input voltage Vi is about 5V. Further, if the forward voltage between the base and the emitter of the pair of first switching elements T1*a* and T1*b* is taken into account, it is possible to determine the resistance of the resistor R2 allowing the control voltage V1 to turn on the switching unit FET.

With this configuration, when the power switch unit (PW_SW) is closed, the level of the control voltage (V1) becomes low, at which the switching unit turns on. The resistor R2 and the pair of first switching elements T1*a* and T1*b* are an example of a first voltage determining unit of the present general inventive concept.

A first circuit unit 25 includes a configuration to determine a level of the control voltage V1 to open and close the switching unit (FET) according to a control signal from a main central processing unit (CPU) 21. The first circuit unit 25 includes a second switching element T2 which turns on or off, to allow the level of the control voltage (V1) to be changed according to a control signal from the main CPU 21. The control signal may be output using a general purpose IP (GPIO) port of the main CPU 21.

The second switching element (T2) may be implemented by a bipolar transistor and the like. A collector of the second switching element (T2) is connected to the control voltage (V1) through a resistor (R3), to which an emitter is grounded. The base of the second switching element (T2) is connected to a control signal output terminal of the main CPU 21 through resistors (R5) and (R6). A diode (D) may be interposed between the resistor (R6) and the second switching element (T2).

In one exemplary embodiment of the present general inventive concept, if the level of the control signal is high, the second switching element (T2) is closed. If the level of the control signal is high, a closed circuitry including a path consisting of an input voltage (Vi), a control voltage (V1) and a second switching element (T2) is made. In this embodiment, the resistance of the resistors R1 and R3 may be determined to allow the control voltage V1 to turn on the switching unit FET when the second switching element T2 is closed. Thus, where the second switching element T2 is closed, the level of the control voltage (V1) becomes low, at which the switching unit (FET) turns on. However, where the second switching element (T2) is opened, the path is opened, forming no closed circuitry. Thus, the level of the control voltage (V1) becomes high, at which the switching unit (FET) turns off. The second switching element (T2) is an example of the second voltage determining unit of the present invention.

The first voltage determining unit achieved by the pair of first switching elements (T1a and T1b) or the like, and the second voltage determining unit achieved by the second switching elements (T2) or the like are connected in parallel with respect to the control voltage (V1). Thus, the level of the control voltage (V1) may be determined by at least one of the first voltage determining unit implemented by the pair of switching elements (T1a and T1b) or the like, and the second voltage determining unit implemented by the second switching element (T2) or the like. In other words, this means that the level of the control voltage (V1) can be determined by at least one of a state of the power switching (PW_SW) and a level of the control signal of the main CPU 21. According to one exemplary embodiment of the present general inventive concept, a power mode conversion control unit is implemented by a resistor having a very low power consumption or no power consumption at an off state, and a switching element, thereby minimizing power consumption at a standby mode. Meanwhile, it is available to more effectively perform a power mode conversion, considering both of a power mode switching event by a user's operation as well as a control of the main CPU 21.

According to an exemplary embodiment of the present general inventive concept, the first circuit unit 25 further includes a capacitor (C) to maintain a turn on state of the second switching element (T2), where the second switching element (T2) turns on. The capacitor (C) is an example of a voltage maintaining unit of the present invention. One end of the capacitor (C) is connected to a contact (V2) of the resistors (R5) and (R6), and also connected to an operating power (VCC) through the resistor (R4). The other end of the capacitor is grounded.

Where the control signal of the main CPU 21 is changed to a low level from a high level, abrupt reduction of the voltage at a ground (V2) is prevented by the capacitor (C). Accordingly, even where the level of the control signal of the main CPU 21 falls down to a low level when the main CPU 21 is reset due to system upgrading, or an internal error in the system, etc. after supply of the operating power, it is possible to maintain the voltage of the ground (V2) by the capacitor (C), to maintain the turn on state of the second switching element (T2). The capacitance of the capacitor C can be determined by the time period during which the maintenance of the turn on state of the second switching element (T2) is secured until the main CPU 21 is reset and the level of the control signal becomes high after the level of the control signal of the main CPU 21 was changed to low.

Further, the main CPU 21 may output the level of the control signal as changed, to allow it to enter a standby mode from a normal mode according to a user's operation. In the state that the image forming apparatus 1 is in a normal mode, the main CPU 21 can determine that it enters the standby mode from the normal mode when the power switch unit (PW_SW) is maintained for a predetermined time or more after being switched from the off state into the on state.

At this time, the OPE control unit 32 detects a state of the power switch unit (PW_SW) according to the user's operation, and reports the detected state of the power switch unit (PW_SW) to the main CPU 21. The OPE control unit 32 monitors an emitter voltage (Vs) of the first switching element (T2b) and detects a state of the power switching unit (PW_SW). If the power switching unit (PW_SW) stands the ON state, the first switching element (T1b), turns on, at which the emitter voltage (Vs) becomes low. If the power switching unit (PW_SW) stands the OFF state, the first switching element (T1b) turns off, at which the emitter voltage (Vs) becomes high. Communications between the main CPU 21 and the OPE control unit 32 may be implemented by a universal asynchronous receiver/transmitter (UART). The OPE control unit 32 is an example of a state reporting unit of the present general inventive concept.

Hereinbelow, a process of controlling a power mode conversion using a first circuit unit 25 and a second circuit unit 31 according to an exemplary embodiment of the present general inventive concept will be described in more details.

1. Power Mode Conversion from Standby Mode to Normal Mode

Figure 3:
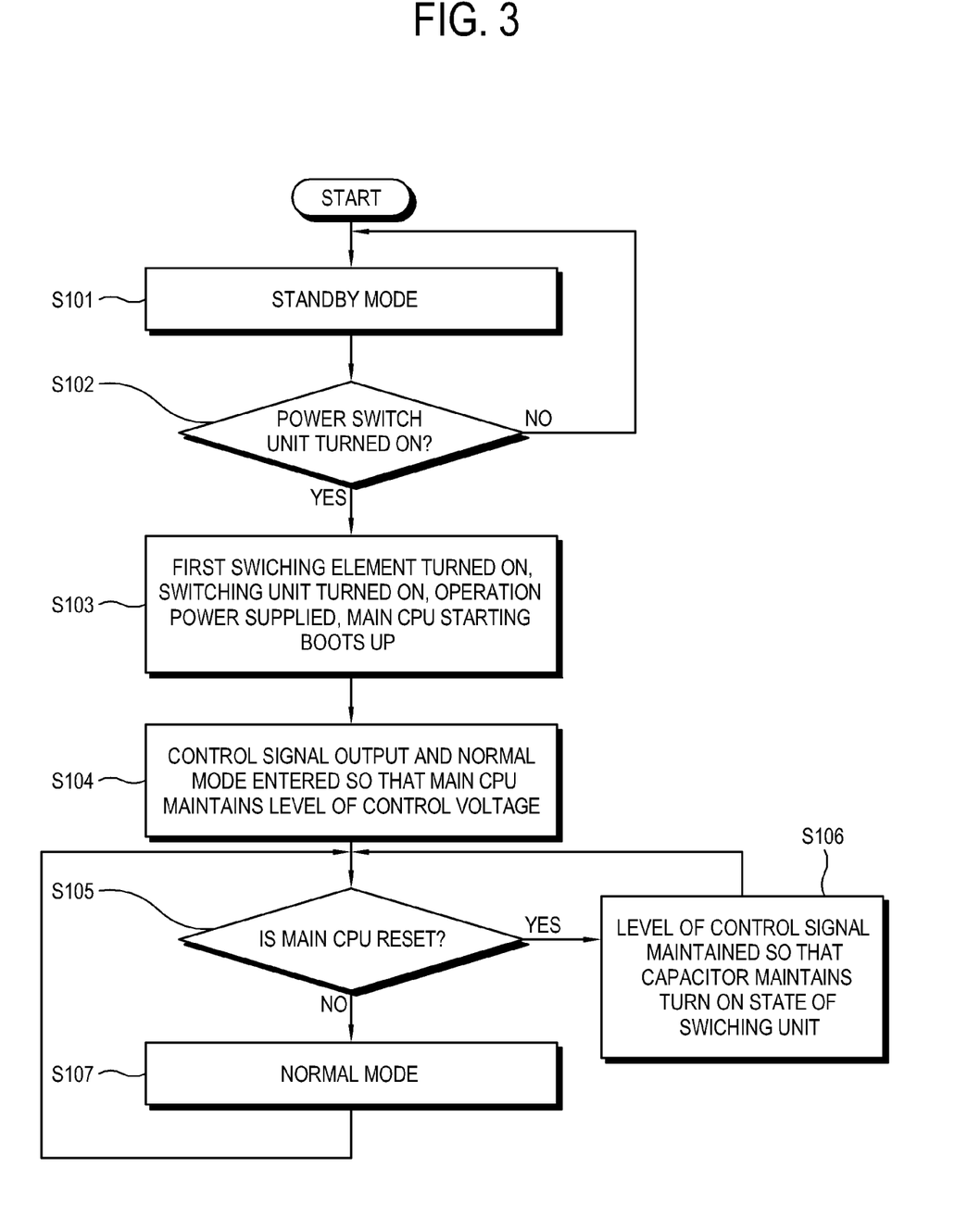
FIG. 3 illustrates a power mode conversion control process of the image forming apparatus according to an exemplary embodiment of the present invention.

FIG. 3 illustrates a power mode conversion control process of an image forming apparatus according to an exemplary embodiment of the present general inventive concept. A state at which the image forming apparatus 1 has entered a standby mode from a normal mode by a certain cause is first considered (S101). In the standby mode, the power switch unit (PW_SW) and the second switching element T2 are all turned off, and the switching unit FET is therefore turned off. Accordingly, supply of operating voltage to the main CPU 21 and so on is interrupted. At this state, it is detected whether the power switching unit (PW_SW) stands an ON state by the user's operation (S102). Where the state of the power switching unit (PW_SW) stands OFF (NO of S102), the standby mode remains unchanged. Subsequently, it is detected whether the power switching unit (PW_SW) stands ON (S102).

Where the state of the power switching unit (PW_SW) stands ON (YES in S102), the pair of first switching elements (T1a and T1b) turn on (S103). According to this, the level of the control voltage (V1) become low, the switching unit (FET) turns on, and the operation voltage (VCC) is supplied (S103). As the operating power (VCC) is supplied, the main CPU 21 begins booting (S103).

After the booting of the main CPU 21 is completed, a control signal of high level is output to maintain the level of the control signal, and it enters the normal mode as the second switching element (T2) turns on by the control signal (S104).

In the normal mode, if the main CPU 21 is reset and the level of the control signal falls down to low (YES in S105), the capacitor (C) maintains the turn on state of the second switching element (T2) until the main CPU 21 outputs a control signal of high level again after reset (S106). Accordingly, the level of the control voltage (V1) is maintained so as to endure the turn on state of the switching unit (FET) (S106).

Meanwhile, where the main CPU 21 is not reset (NO in S105), the normal mode is maintained (S107) and operation S105 is subsequently performed.

2. Conversion from Normal Mode to Standby Mode

Figure 4:
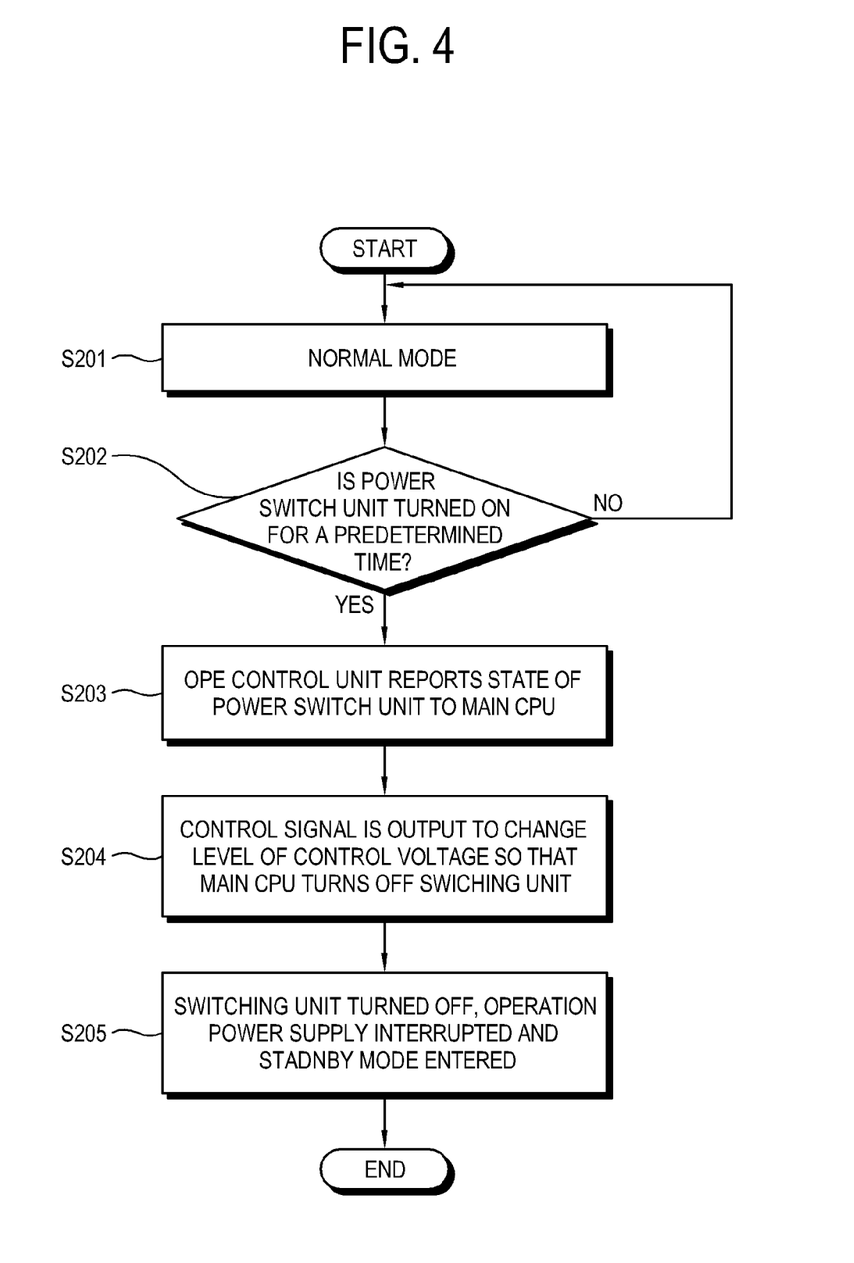
FIG. 4 illustrates a power mode conversion control process of the image forming apparatus according to another exemplary embodiment of the present invention.

FIG. 4 illustrates a power mode conversion control process of an image forming apparatus 1 according to another exemplary embodiment of the present general inventive concept. First, a normal mode in which the main CPU 21 outputs a control signal of high level, to turn on the second switching element (T2), and the level of the control voltage (V1) is low and the switching unit (FET) turns on, and the operating voltage (VCC) is supplied is considered (S201).

In the normal mode, the OPE control unit 32 detects whether the power switch unit (PS_SW) turns on for a predetermined time or more according to the user's operation (S202). If the power switch unit (PW_SW) does not turn on for a predetermined time or more (NO in S202), the normal mode is continued (S201). Where the power switch unit (PW_SW) turns on for a predetermined time or more (YES in S202), the OPE control unit 32 reports the state of the power switch unit (PW_SW) to the main CPU 21 (S203).

The main CPU 21 outputs a control signal of low level, when a predetermined operation for entering the standby mode is performed and then finished, as reported by the OPE control unit 32, turning off the second switching element (T2) accordingly (S204). As the second switching element T2 turns off, the level of the control voltage becomes high, thereby turning off the switching unit (FET) (S205). As a result, supply of the operating voltage (VCC) to the main CPU 21 and so on is interrupted, and it enters a standby mode (S205).

Figure 5:
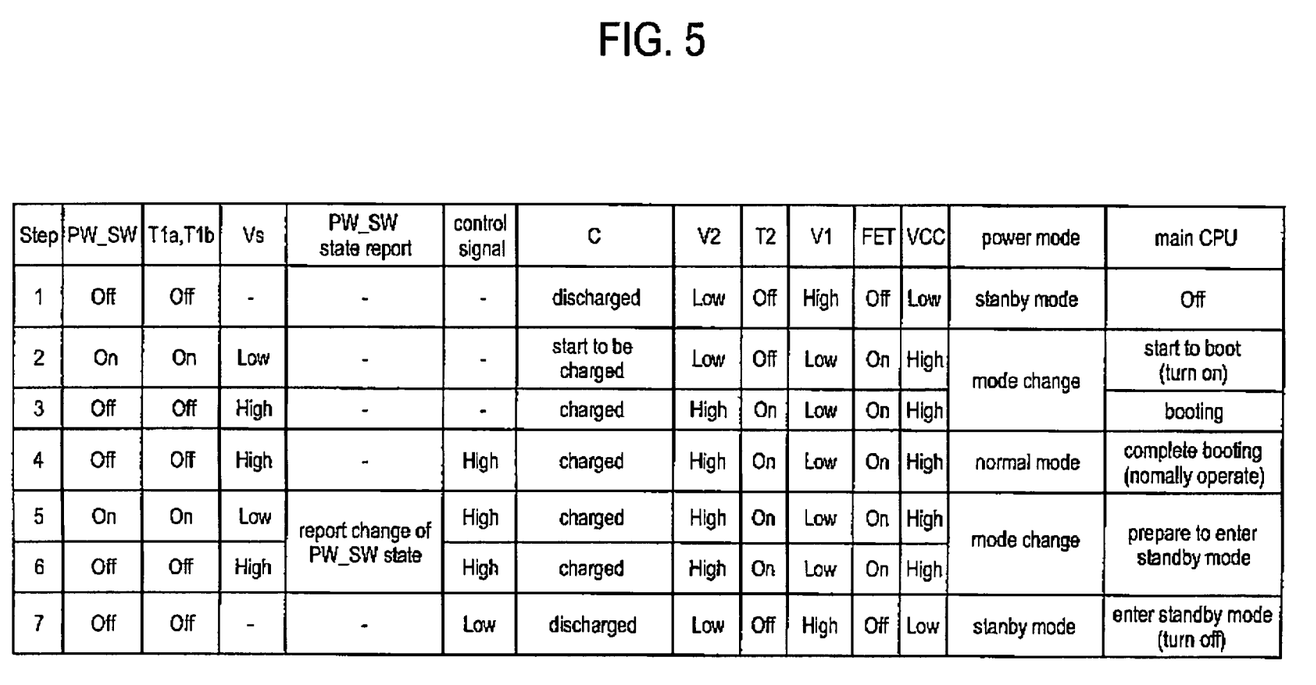
FIG. 5 is a table illustrating operation of the first and second circuit portions of FIG. 2.

FIG. 5 illustrates a table to show the operations of elements of the first circuit unit 25 and the second circuit unit 31 of FIG. 2. Referring to FIG. 5, "step" indicates operations of the elements of the first circuit unit 25 and the second circuit unit 30 of FIG. 2. For example, one step is changed to another step according to at least one of an operation of the power switch unit (PW_SW), an operation of second switching element (T2), and an operation of the second switching element T2. However, the present general inventive concept is not limited thereto. Since a power mode is determined and a state or operation of the main CPU 21 is determined according to the operations of the elements of the first circuit unit 25 and the second circuit unit 30, it is possible that a circuit unit, for example, the first circuit unit 25 and the second circuit unit 30, can be changed or modified such that the state of the operating voltage (VCC), the conversion of the power mode, and the operation of the main CPU 21 are generated as illustrated in FIG. 5.

As described above, according to the present general inventive concept, power consumption in a standby mode can be minimized and simultaneously a power mode conversion event can be properly considered, in the power mode conversion control.

Although a few exemplary embodiments of the present invention have been illustrated and described in details, the present general inventive concept shall be limited thereto, and can be carried out in a various manner, within the scope of the claims as claimed in the specification. For example, FIG. 2 illustrates an example that the voltage maintaining unit as well as the first voltage determining unit and the second voltage determining unit are all implemented. However, the present general inventive concept may also be carried out without the voltage maintaining unit.

Further, it will be appreciated by those skilled in the art that changes may be made in these exemplary embodiments without departing from the principles and spirit of the invention, the scope of which is defined in the appended claims and their equivalents.

What is claimed is:

1. An image forming apparatus including a plurality of components to control operations of the image forming apparatus, comprising:
  a voltage controlled switch to be switchable in response to a determined level of a first voltage to selectively turn on or off supply of a second power as operating power;
  an operating power switch connected to the voltage controlled switch;
  a power switch control circuit connected to the operating power switch and to control a switch between a normal mode in which the operating power is supplied to the plurality of components and a stand-by mode in which the operating power is not supplied to the plurality of components;
  a controller to control the plurality of components to operate to perform an image forming operation when in the normal mode in which the operating power is supplied to the controller and to be in the stand-by mode in which the operating power is not supplied to the controller; and
  a switching circuit connected to the controller and connected to the voltage controlled switch,
  wherein, when the controller and the plurality of components are in the stand-by mode, in which the operating power is not supplied through the voltage controlled switch to the power switch control circuit, the controller, and the plurality components, and a state of the operating power switch is to switch from the stand-by mode to the normal mode,
    the power switch control circuit is to determine the level of the first voltage to cause turning on the voltage controlled switch to output supply of the second power as the operating power to the power switch control circuit, the controller, and to the plurality of components; and
  wherein, when the controller and the plurality of components are in the normal mode in which the operating power is supplied to the power switch control circuit, the controller, and the plurality of components, and the state of the operating power switch is to switch from the normal mode to the stand-by mode,
    the power switch control switch is to send a power switch off signal to the controller to cause the controller to send a control signal to the switching circuit to cause a determination of the level of the first voltage to turn off the voltage controlled switch to turn off the second power as the operating power supplied to the power switch control circuit, the controller, and the plurality of components.

2. The image forming apparatus of claim 1, wherein:
  when the state of the operating power switch is to switch from the stand-by mode to a normal mode, the power switch control circuit is to send a power switch on signal to the controller to cause the controller to send a control signal to turn on the switching circuit to determine the level of the first voltage to maintain the turned on state the voltage controlled switch, while the controller and the plurality of components are in the normal mode.

3. The image forming apparatus of claim 2, wherein when the operating power switch is to switch from the normal mode to the stand-by mode, the voltage controlled switch is further caused to turn off the supply of the operating power after the power switch control circuit sends the power switch off signal to the controller.

4. The image forming apparatus of claim 1, further comprising a power supply unit to supply the second power of about 1 watt toward the power switch control circuit while the image forming apparatus is in the stand-by mode to enable the voltage controlled switch to turn on when the operating power switch is to switch from the stand-by mode to the normal mode.

5. A control method for an image forming apparatus, the method comprising:
   determining, by a power switch control circuit, a level of a first voltage to a voltage controlled switch in response to a state of an operating power switch, to thereby cause the power switch control circuit to switch between a normal mode in which a second power as operating power is supplied through the voltage controlled switch to a plurality of components,
   controlling, by a controller, the plurality of components to operate to perform an image forming operation when in the normal mode in which the operating power is supplied to the controller and to be in a stand-by mode in which the operating power is not supplied to the controller;
   controlling, by the controller a switching circuit connected to the voltage controlled switch to cause a determination of the level of the first voltage to the voltage controlled switch to switch to turn off supply of the second power as the operating power to the power switch controller, the controller, and the plurality of components;
   when the controller and the plurality of components are in the stand-by mode in which the operating power is not supplied through the voltage controlled switch to the power switch control circuit, the controller, and the plurality components, and the state of the operating power switch is to switch from the stand-by mode to the normal mode,
      the power switch control circuit is to determine the level of the first voltage to cause turning on the voltage controlled switch to output supply of the second power as the operating power to the power switch control circuit, the controller, and to the plurality of components, and
   when the controller and the plurality of components are in the normal mode in which the operating power is supplied to the power switch control circuit, the controller, and the plurality of components, and the state of the operating power switch is to switch from the normal mode to the stand-by mode,
      sending, by the power switch control circuit, a power switch off signal to the controller to cause the switching circuit to determine the level of the first voltage to turn off the voltage controlled switch to turn off the second power as the operating power supplied to the power switch control circuit, the controller, and the plurality of components.

6. The control method of claim 5, wherein:
   when the state of the operating power switch is to switch from the stand-by mode to the normal mode, sending by the power switch control circuit a power switch on signal to the controller to cause the controller to send a control signal to turn on the switching circuit to determine the level of the first voltage to maintain the turned on state of the voltage controlled switch, while the controller and the plurality of components are in the normal mode.

7. The control method of claim 6, wherein when the operating power switch is to switch from the normal mode to the stand-by mode, causing the voltage controlled switch to turn off the supply of the operating power after the power switch control circuit sends the power switch off signal to the controller.

8. The control method of claim 5, further comprising supplying, by a power supply unit, the second power of about 1 watt toward the power switch control circuit while the image forming apparatus is in the stand-by mode to enable the voltage controlled switch to turn on when the operating power switch is to switch from the stand-by mode to the normal mode.

* * * * *